US011521392B2

(12) United States Patent
Bamba et al.

(10) Patent No.: US 11,521,392 B2
(45) Date of Patent: Dec. 6, 2022

(54) IMAGE PROCESSING APPARATUS AND IMAGE PROCESSING METHOD FOR IMAGE ANALYSIS PROCESS

(71) Applicant: CANON KABUSHIKI KAISHA, Tokyo (JP)

(72) Inventors: Yasuo Bamba, Tokyo (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 16/825,429

(22) Filed: Mar. 20, 2020

(65) Prior Publication Data

US 2020/0311440 A1   Oct. 1, 2020

(30) Foreign Application Priority Data

Apr. 1, 2019   (JP) .............................. JP2019-069997

(51) Int. Cl.
*G06V 20/52*   (2022.01)
*G06V 10/50*   (2022.01)
(Continued)

(52) U.S. Cl.
CPC ................ *G06V 20/53* (2022.01); *G06T 7/11* (2017.01); *G06T 7/215* (2017.01); *G06V 10/50* (2022.01);
(Continued)

(58) Field of Classification Search
None
See application file for complete search history.

(56) References Cited

U.S. PATENT DOCUMENTS

2007/0160288 A1*   7/2007   Hoffman ................ H04N 5/147
                                                382/168
2010/0195865 A1*   8/2010   Luff ....................... H04H 60/33
                                                382/100
(Continued)

FOREIGN PATENT DOCUMENTS

JP   2007-201556 A   8/2007
JP   2009-181307 A   8/2009
(Continued)

OTHER PUBLICATIONS

Ikeda, et al., "Accuracy Improvement of People Counting Based on Crowd-Patch Learning Using Convolutional Neural Network", FIT2014, The Thirteenth Forum on Information Technology, 2014.
(Continued)

*Primary Examiner* — Emily C Terrell
*Assistant Examiner* — Nathan J Bloom
(74) *Attorney, Agent, or Firm* — Canon U.S.A., Inc. IP Division

(57) ABSTRACT

An image processing apparatus including a determination unit configured to determine, for each of a plurality of partial areas set in an input image, a priority for executing a first image analysis process, based on an image of the partial area and a corresponding image corresponding to the partial area, the corresponding image being in a past image analyzed before the input image, a selection unit configured to select at least one of partial areas from the plurality of partial areas, based on the determined priority, and a first analysis unit configured to execute the first image analysis process on each of the at least one of partial areas selected.

17 Claims, 13 Drawing Sheets

(51) Int. Cl.
*G06V 10/75* (2022.01)
*G06T 7/11* (2017.01)
*G06T 7/215* (2017.01)

(52) U.S. Cl.
CPC .... G06V 10/75 (2022.01); *G06T 2207/10016* (2013.01); *G06T 2207/20021* (2013.01); *G06T 2207/30196* (2013.01); *G06T 2207/30232* (2013.01); *G06T 2207/30236* (2013.01)

(56) References Cited

U.S. PATENT DOCUMENTS

| | | | | |
|---|---|---|---|---|
| 2010/0271484 | A1* | 10/2010 | Fishwick | G06T 7/238 348/169 |
| 2011/0261225 | A1* | 10/2011 | Niinami | G06T 7/248 348/223.1 |
| 2013/0265412 | A1* | 10/2013 | Abe | H04N 5/23232 348/95 |
| 2014/0369555 | A1* | 12/2014 | Zhong | G06K 9/3233 382/103 |
| 2015/0098652 | A1* | 4/2015 | Chen | G06T 7/136 382/180 |
| 2018/0348500 | A1* | 12/2018 | Naaman, III | G06K 9/00134 |
| 2019/0102630 | A1* | 4/2019 | Bamba | G06T 11/60 |
| 2019/0220673 | A1* | 7/2019 | Ikeda | G06K 9/00778 |
| 2019/0244370 | A1* | 8/2019 | Jaroch | G06T 7/248 |

FOREIGN PATENT DOCUMENTS

| | | |
|---|---|---|
| JP | 2017-68598 A | 4/2017 |
| JP | 2018-74299 A | 5/2018 |

OTHER PUBLICATIONS

Lempitsky, et al., "Learning to Count Objects in Images", Advances in Neural Information Processing Systems (NIPS), 2010.

* cited by examiner

FIG.5
| INDEX | CORRESPONDING IMAGE | ESTIMATED NUMBER OF PEOPLE | TIMESTAMP |
|---|---|---|---|
| 1 | 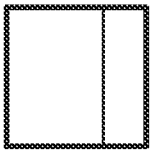 | 0.0 | T1 |
| 2 | 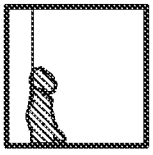 | 0.9 | T1 |
| 3 | 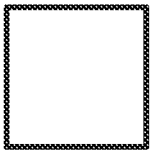 | 0.0 | T1 |
| ⋮ | | ⋮ | ⋮ |
| N |  | 0.1 | T1 |

FIG.7
| INDEX | CORRESPONDING IMAGE | ESTIMATED NUMBER OF PEOPLE | TIMESTAMP | PARTIAL IMAGE | PRIORITY |
|---|---|---|---|---|---|
| 1 |  | 0.0 | T1 |  | 0.1 |
| 2 |  | 0.9 | T1 |  | 0.5 |
| 3 |  | 0.0 | T1 |  | 0.1 |
| ⋮ | | ⋮ | ⋮ | | |
| N |  | 0.1 | T1 |  | 0.8 |

FIG.8
| INDEX | CORRESPONDING IMAGE | ESTIMATED NUMBER OF PEOPLE | TIMESTAMP |
|---|---|---|---|
| 1 | 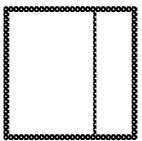 | 0.0 | T1 |
| 2 | 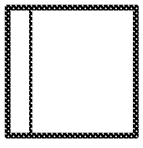 | 0.0 | T2 |
| 3 | 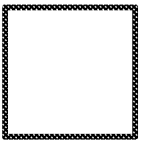 | 0.0 | T1 |
| ⋮ | | ⋮ | ⋮ |
| N | 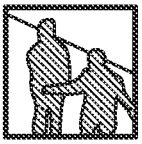 | 2.3 | T2 |

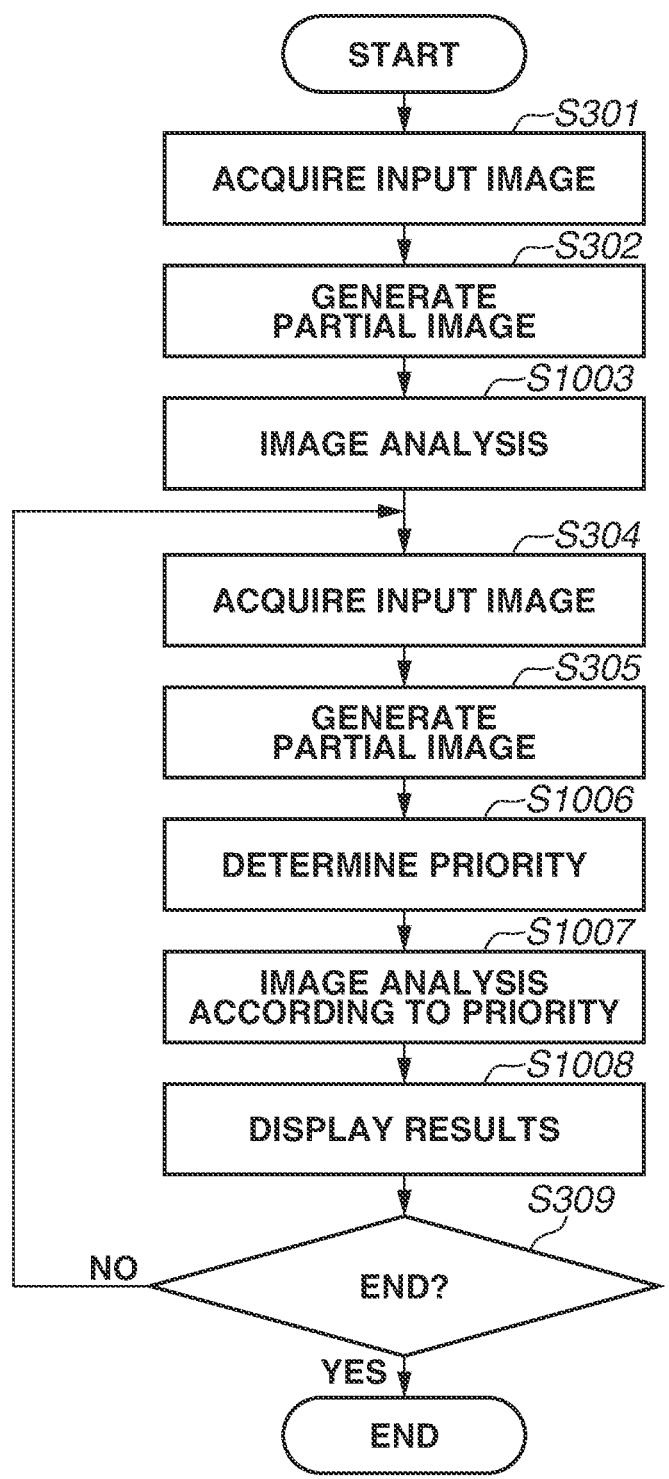

FIG.11
| INDEX | CORRESPONDING IMAGE | NUMBER OF PEOPLE ESTIMATED BY FIRST ANALYZER | NUMBER OF PEOPLE ESTIMATED BY SECOND ANALYZER | TIMESTAMP |
|---|---|---|---|---|
| 1 | 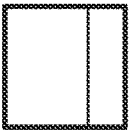 | 0.0 | 0.3 | T1 |
| 2 |  | 0.9 | 1.3 | T1 |
| 3 |  | 0.0 | 0.2 | T1 |
| ⋮ | ⋮ | ⋮ | ⋮ | ⋮ |
| N |  | 0.1 | 0.7 | T1 |

FIG.12

| INDEX | CORRESPONDING IMAGE | NUMBER OF PEOPLE ESTIMATED BY FIRST ANALYZER | NUMBER OF PEOPLE ESTIMATED BY SECOND ANALYZER | TIMESTAMP | | PARTIAL IMAGE | NUMBER OF PEOPLE ESTIMATED BY SECOND ANALYZER | PRIORITY |
|---|---|---|---|---|---|---|---|---|
| 1 | ▢ | 0.0 | 0.3 | T1 | | ▢ | 0.2 | 0.2 |
| 2 | ▨ | 0.9 | 1.3 | T1 | | ▢ | 0.1 | 1.2 |
| 3 | ▢ | 0.0 | 0.2 | T1 | | ▢ | 0.2 | 0.1 |
| ... | | ... | ... | ... | | | ... | |
| N | ▨ | 0.1 | 0.7 | T1 | | ▨ | 3.5 | 2.8 |

FIG.13
| INDEX | CORRESPONDING IMAGE | NUMBER OF PEOPLE ESTIMATED BY FIRST ANALYZER | NUMBER OF PEOPLE ESTIMATED BY SECOND ANALYZER | TIMESTAMP |
|---|---|---|---|---|
| 1 |  | 0.0 | 0.3 | T1 |
| 2 |  | 0.0 | 0.1 | T2 |
| 3 |  | 0.0 | 0.2 | T1 |
| ⋮ | ⋮ | ⋮ | ⋮ | ⋮ |
| N |  | 2.3 | 3.5 | T2 |

IMAGE PROCESSING APPARATUS AND IMAGE PROCESSING METHOD FOR IMAGE ANALYSIS PROCESS

BACKGROUND OF THE INVENTION

Field of the Invention

The present invention relates to an image processing apparatus and an image processing method for performing an image analysis process on a captured image.

Description of the Related Art

In recent years, techniques for performing an image analysis process, such as a number-of-people estimation process, a flow-of-people estimation process, or an abnormality detection process, on an image captured by an imaging apparatus such as a security camera are discussed. Since these techniques can detect congestion in a public space and track the flow of people in congestion, it is expected that the techniques are utilized in congestion elimination at the time of an event and appropriate evacuation guidance at the time of disaster.

As a method for estimating the number of people in an image, a method using a recognition model obtained by machine learning to estimate the number of people appearing in a predetermined area in an image is discussed. Japanese Patent Application Laid-Open No. 2007-201556 discusses a method for counting the number of people detected by a human body detection unit. Japanese Patent Application Laid-Open No. 2009-181307 discusses a technique by which feature amounts such as a corner, an edge, and the intensity of a high-frequency range are extracted from an image and a degree of congestion in the image is estimated from the extracted feature amount.

According to a technique discussed in Lempitsky and Zisserman. Learning To Count Objects in Images. Advances in Neural Information Processing Systems (NIPS), 2010, a density map estimator that estimates a density map of a target object is learnt by machine learning, a density map of an input image is obtained, and the sum of elements in the density map is calculated, to estimate the number of objects.

According to a technique discussed in Hiroo Ikeda, Ryoma Oami, Hiroyoshi Miyano. Accuracy Improvement of People Counting Based on Crowd-Patch Learning Using Convolutional Neural Network. FIT2014 the Thirteenth Forum on Information Technology, 2014, a regressor to which a small image of a fixed size is input and from which the number of people in the small image is output is learnt by machine learning, the numbers of people in small images representing small areas in an image is obtained using the regressor, and the sum of the numbers of people is calculated, to estimate the number of people.

As a method for estimating the flow of people in an image, Japanese Patent Application Laid-Open No. 2018-74299 discusses a technique by which the number of passing people in a crowd is estimated from an estimation result of the flow rate of the crowd and an estimation result of the number of people in the crowd.

As a method for detecting an abnormality in an image, Japanese Patent Application Laid-Open No. 2017-68598 discusses a technique by which a time-series image is divided into a plurality of time-space segments, a motion feature amount is calculated in each of the time-space segments, and each time-space segment is classified into either of a normal segment and an abnormal segment.

In an image analysis process using machine learning such as deep learning, the analysis processing time may become excessive. For example, in a case where the number of people in the entirety of an image is estimated, it may take several seconds to several tens of seconds or more of processing time to update the result of the estimation process. In a case where a single image processing apparatus performs the image analysis process on images from a plurality of imaging apparatuses, the processing time further increases. If the time taken for the image analysis process becomes excessive, the image analysis process may not be able to be performed in time for an ever-changing situation.

There is a need in the art for supporting the achievement of a faster image analysis process.

SUMMARY OF THE INVENTION

According to an aspect of the present disclosure, an image processing apparatus includes a determination unit configured to determine, for each of a plurality of partial areas set in an input image, a priority for executing a first image analysis process, based on an image of the partial area and a corresponding image corresponding to the partial area, the corresponding image being in a past image analyzed before the input image, a selection unit configured to select at least one of partial areas from the plurality of partial areas, based on the determined priority, and a first analysis unit configured to execute the first image analysis process on each of the at least one of partial areas selected by selecting.

Further features of the present disclosure will become apparent from the following description of exemplary embodiments with reference to the attached drawings.

BRIEF DESCRIPTION OF THE DRAWINGS

FIG. 5 is a diagram illustrating an example of management information.

FIG. 7 is a diagram illustrating examples of obtained priorities.

FIG. 8 is a diagram illustrating an example of the management information.

FIG. 10 is a flowchart illustrating an example of processing of an image processing apparatus.

FIG. 11 is a diagram illustrating an example of management information.

FIG. 12 is a diagram illustrating examples of obtained priorities.

FIG. 13 is a diagram illustrating an example of the management information.

DESCRIPTION OF THE EMBODIMENTS

Exemplary embodiments of the present disclosure will be described in detail below with reference to the drawings.

Figure 1:
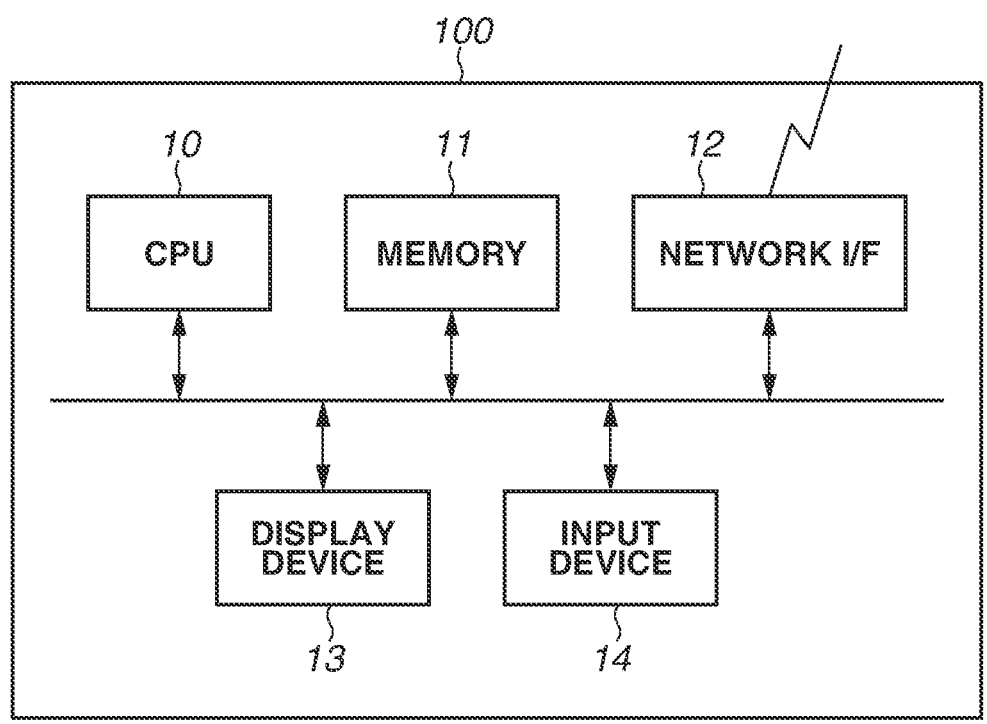
FIG. 1 is a diagram illustrating an example of a hardware configuration of an image processing apparatus.

FIG. 1 is a diagram illustrating an example of the hardware configuration of an image processing apparatus 100 according to a first exemplary embodiment. The image processing apparatus 100 is an information processing apparatus that executes an image analysis process on an input image. While, in the present exemplary embodiment, the image processing apparatus 100 is a personal computer (PC), a different information processing apparatus such as a server apparatus or a tablet apparatus can be used.

In the present exemplary embodiment, the image processing apparatus 100 executes as the image analysis process a number-of-people estimation process for estimating the number of people in an image.

The image processing apparatus 100 includes a central processing unit (CPU) 10, a memory 11, a network interface (I/F) 12, a display device 13, and an input device 14. These components are connected to each other via a system bus so that the components can communicate with each other.

The CPU 10 is a central arithmetic unit that controls the entirety of the image processing apparatus 100. The memory 11 is a storage device that stores data and a program that are used in processing by the CPU 10. In the present exemplary embodiment, the memory 11 includes a random-access memory (RAM) that functions as a work area for the CPU 10, and a read-only memory (ROM) that stores various programs and various types of data. The memory 11 may further include an auxiliary storage device such as a hard disk drive (HDD) or a solid-state drive (SSD). The memory 11 may include an attachable and detachable auxiliary storage device such as an attachable and detachable semiconductor memory. The memory 11 is an example of a storage unit.

The network I/F 12 is an interface for communication with an external apparatus via a network. The display device 13 is a display device that displays the result of processing of the CPU 10. Examples of the display device 13 include a display, a monitor, and a touch panel. While, in the present exemplary embodiment, the display device 13 is a liquid crystal display device, a different display device such as an organic electroluminescent (EL) display device can be used. The display device 13 is an example of a display unit. Examples of the input device 14 include a mouse and a hardware button. The CPU 10 receives information input via the input device 14 from a user.

Figure 2:
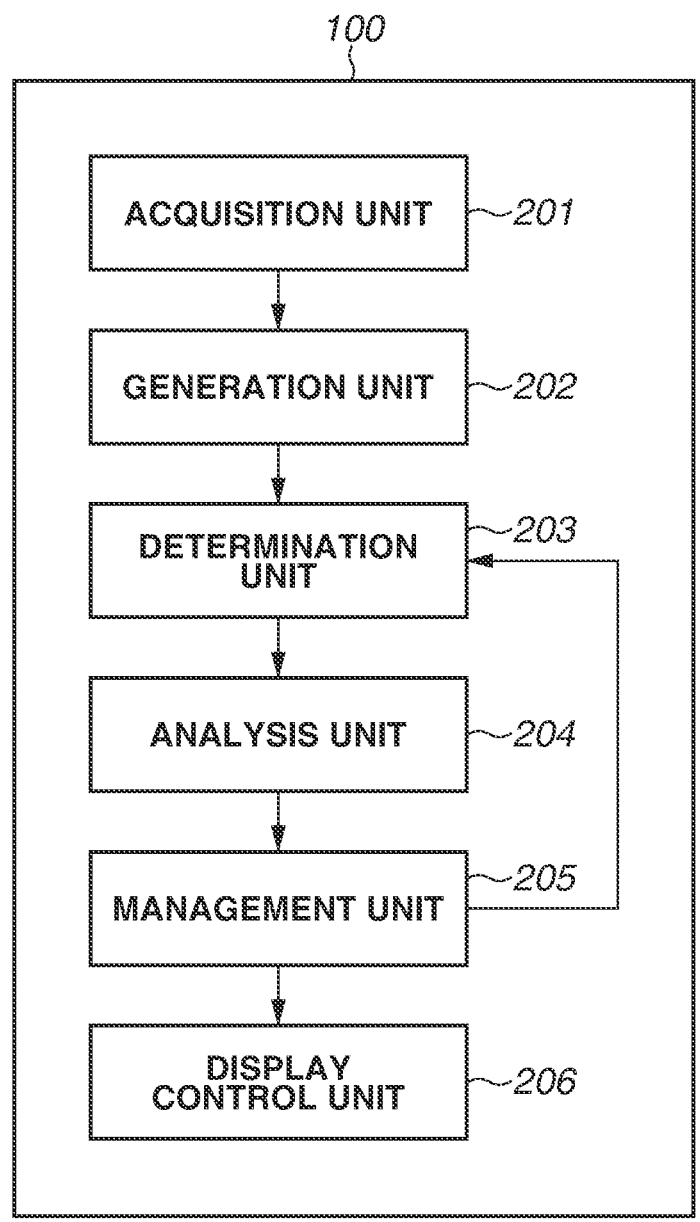
FIG. 2 is a diagram illustrating an example of a functional configuration of the image processing apparatus.
Figure 3:
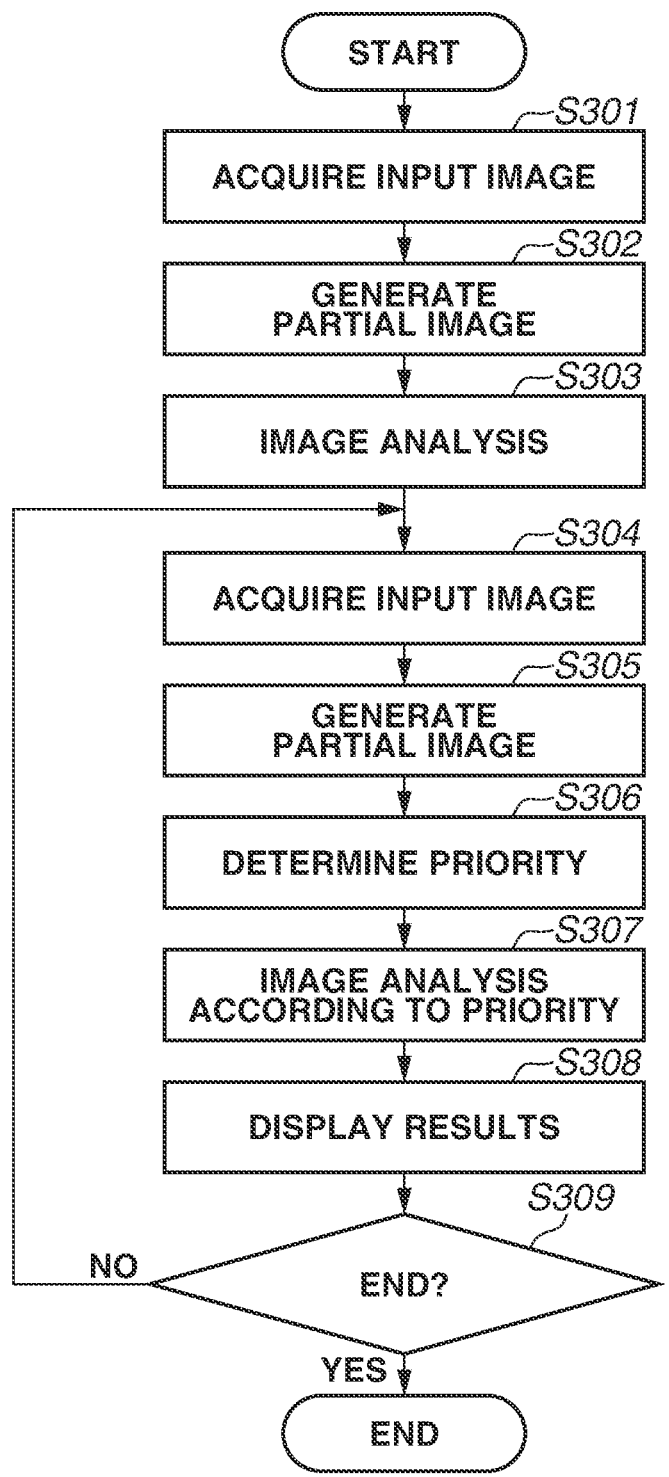
FIG. 3 is a flowchart illustrating an example of processing of the image processing apparatus.

The functions of the image processing apparatus 100 described below with reference to FIG. 2 and the processing of a flowchart described below with reference to FIG. 3 are achieved by the CPU 10 executing processing according to a program stored in the memory 11. Alternatively, as another example, the functions of the image processing apparatus 100 described below with reference to FIG. 2 and the processing of the flowchart described below with reference to FIG. 3 may be achieved by the CPU 10 executing processing according to a program downloaded from an external apparatus.

FIG. 2 is a diagram illustrating an example of the functional configuration of the image processing apparatus 100 according to the present exemplary embodiment. The image processing apparatus 100 includes an acquisition unit 201, a generation unit 202, a determination unit 203, an analysis unit 204, a management unit 205, and a display control unit 206.

The acquisition unit 201 acquires an image input as a target of an image analysis process (hereinafter referred to as an "input image"), and the timestamp of the input image. The timestamp is information indicating the time when the input image corresponding to the timestamp is captured. The acquisition unit 201 transmits the acquired input image to the generation unit 202.

In the present exemplary embodiment, the size of the input image acquired by the acquisition unit 201 is fixed. In the present exemplary embodiment, a plurality of areas is set in advance in an area in the input image acquired by the acquisition unit 201. Hereinafter, each of the plurality of areas will be referred to as a "partial area". In the present exemplary embodiment, the number of the partial areas set in the area in the input image is represented as N. In the present exemplary embodiment, numbers 1 to N are set for the partial areas.

In the present exemplary embodiment, the image processing apparatus 100 is connected to an imaging apparatus (e.g., a security camera having a network function) outside the image processing apparatus 100 via the network I/F 12. Hereinafter, the imaging apparatus connected to the image processing apparatus 100 via the network I/F 12 will be referred to as a "connected imaging apparatus".

In the present exemplary embodiment, the acquisition unit 201 acquires, as the input image from the connected imaging apparatus, an image captured by the connected imaging apparatus. As an alternative example, the acquisition unit 201 may acquire the input image by a different method. For example, the acquisition unit 201 may acquire, as the input image, an image stored in the memory 11. Yet alternatively, for example, the acquisition unit 201 may acquire, as the input image, an image received from an external apparatus via the network I/F 12.

The generation unit 202 acquires images of the partial areas in the input image from the input image acquired by the acquisition unit 201. The generation unit 202 resizes each of the acquired images of the partial areas to a fixed size determined in advance, to generate an image representing each of the partial areas in the input image. Hereinafter, the image generated by the generation unit 202 and representing each of the partial areas in the input image will be referred to as a "partial image".

The determination unit 203 determines a priority in the image analysis process for each of the partial images generated by the generation unit 202. The priority in the image analysis process is an indicator indicating how preferentially the image analysis process is to be performed on the partial image corresponding to the priority.

In a form according to the priorities given by the determination unit 203, the analysis unit 204 performs the image analysis process on some of the partial images generated by the generation unit 202.

The management unit 205 stores and manages, in the memory 11, management information including information regarding the result of the image analysis process obtained by the analysis unit 204, and information that is used to determine a priority by the determination unit 203. The management information is an example of result information in which information regarding a result of an image analysis process on an input image is stored. The details of the management information will be described below with reference to FIG. 5.

The display control unit 206 displays, on the display device 13, the input image acquired by the acquisition unit 201 and the result of the image analysis process managed by the management unit 205.

FIG. 3 is a flowchart illustrating an example of the processing of the image processing apparatus 100 according to the present exemplary embodiment. In step S301, the acquisition unit 201 acquires from the connected imaging apparatus an input image and a timestamp indicating the time when the input image is captured. Hereinafter, the input image acquired in step S301 will be represented as I1. Hereinafter, the timestamp of the input image I1 acquired in step S301 will be represented as T1.

In step S302, the generation unit 202 acquires an image of each of N partial areas in the input image I1 acquired by the acquisition unit 201.

Figure 4:
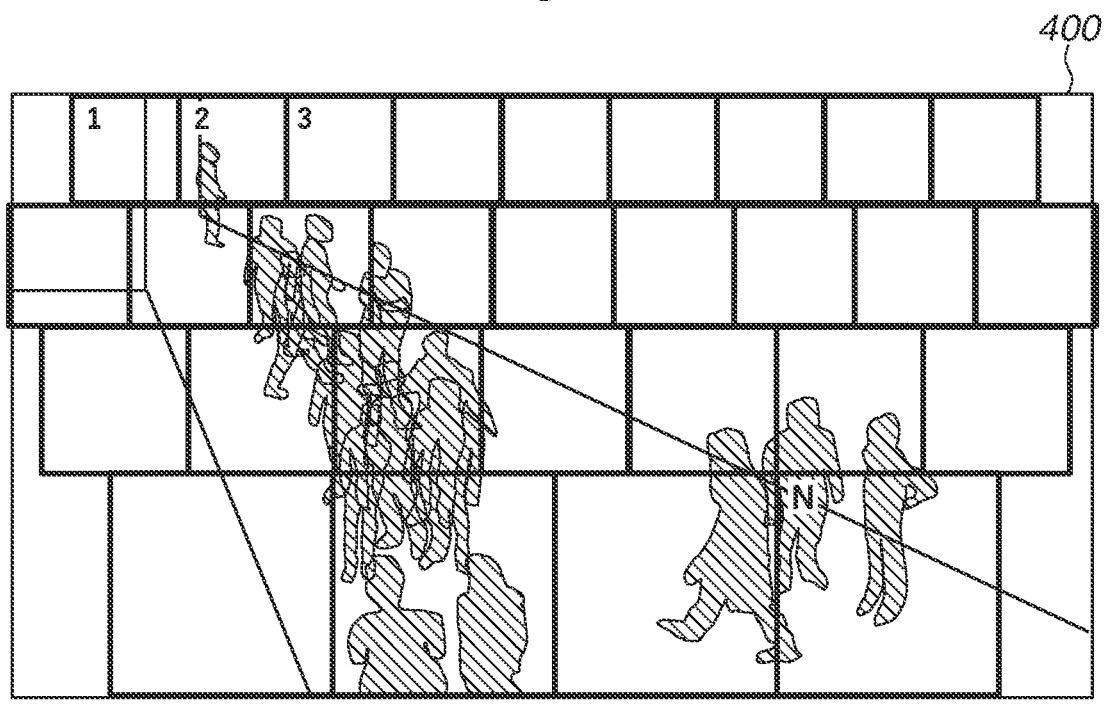
FIG. 4 is a diagram illustrating an example of an input image.

FIG. 4 is a diagram illustrating examples of the N partial areas. An image 400 illustrates the input image I1. Each of areas indicated by rectangular frames illustrated in FIG. 4 is a partial area. In the present exemplary embodiment, the N partial areas are set so that the ratio of the size of each partial area and the size of a human body appearing in the partial area falls within a range determined in advance.

The generation unit 202 resizes the acquired image of each of the partial areas to a fixed size, to generate a partial image.

In step S303, the analysis unit 204 performs an image analysis process (a number-of-people estimation process in the present exemplary embodiment) on each of the partial images generated in step S302. The analysis unit 204 executes the number-of-people estimation process using a known technique discussed in the above literature, to acquire the estimated value of the number of people in each of the partial images.

In the present exemplary embodiment, based on a known machine learning technique, such as a support vector machine and deep learning, the image processing apparatus 100 learns in advance an estimator that estimates a density map of people using an image as learning data in the state where the number of people appearing in the image is known. Then, the analysis unit 204 inputs each of the partial images generated in step S302 to the learned estimator, to acquire a density map corresponding to the partial image. The analysis unit 204 obtains the sum of pixels in the acquired density map, whereby the estimated value of the number of people present in an i-th partial area in the input image I1 is acquired.

In the present exemplary embodiment, management information, which is a table that stores the result of the image analysis process with respect to each partial area, is stored in advance in the memory 11.

FIG. 5 is a diagram illustrating an example of the management information. The management information includes items such as an index, a corresponding image, the estimated number of people, and a timestamp.

The index is an item indicating the number of a partial area. The corresponding image is an item indicating an image associated with a partial area. The corresponding image indicates a partial image of a partial area corresponding to the corresponding image in an input image acquired by the acquisition unit 201. The estimated number of people is an item indicating the result of the number-of-people estimation process (the image analysis process in the present exemplary embodiment) associated with a partial area. The estimated number of people indicates the result of the number-of-people estimation process on a corresponding image corresponding to the estimated number of people. The timestamp is an item indicating the time when a corresponding image corresponding to the timestamp is captured. That is, the timestamp indicates the time when an input image on which the corresponding image corresponding to the timestamp is based is captured.

With respect to each of the partial areas, the management unit 205 registers, in the management information, a partial image that is an image of the partial area in the input image I1, the result of the image analysis process on the partial image by the analysis unit 204, and the timestamp of the partial image.

In the present exemplary embodiment, a corresponding image registered in the management information and corresponding to the i-th partial area is represented as $s_i$. The estimated number of people registered in the management information and corresponding to the i-th partial area is represented as $e_i$. A timestamp registered in the management information and corresponding to the i-th partial area is represented as $t_i$.

The management information illustrated in FIG. 5 indicates the content of the management information at the end time of the process of step S303 in the present exemplary embodiment.

In step S304, the acquisition unit 201 acquires anew an input image and the timestamp of the input image from the connected imaging apparatus. Hereinafter, the input image acquired in step S304 will be represented as I2. Hereinafter, the timestamp of the input image I2 will be represented as T2.

Figure 6:
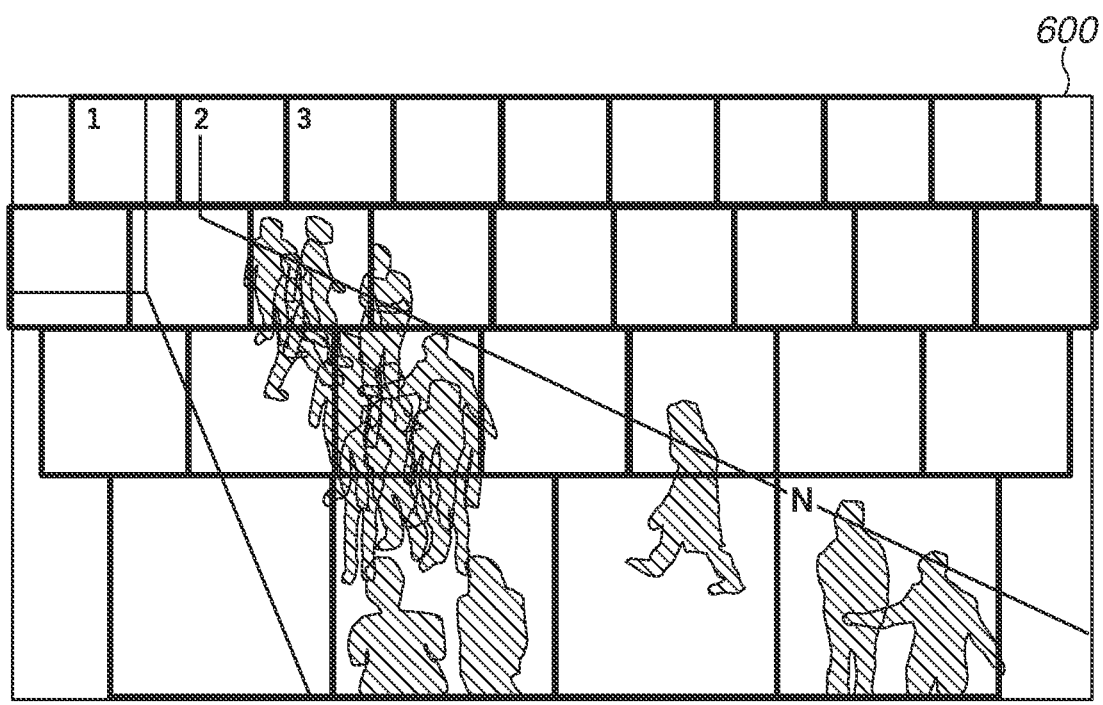
FIG. 6 is a diagram illustrating an example of an input image.

In step S305, the generation unit 202 performs a process similar to that of the step S302 on the input image I2, to generate a partial image corresponding to each of partial areas in the input image I2. Hereinafter, a partial image corresponding to the i-th partial area generated in step S305 will be represented as $s'_i$. FIG. 6 illustrates the states of the partial areas in the input image I2. An image 600 illustrates the input image I2. Each of areas indicated by rectangular frames illustrated in FIG. 6 is a partial area.

In step S306, the determination unit 203 determines a priority in the image analysis process for each of the partial images generated from the input image I2 in step S305. Hereinafter, the priority in the image analysis process determined for the partial image $s'_i$ will be represented as $p_i$.

The priority $p_i$ in the image analysis process regarding the partial image $s'_i$ is an indicator that is determined to be higher with an increasing difference between the corresponding image $s_i$ registered in the management information and the partial image $s'_i$. It is considered that the greater the difference between the corresponding image $s_i$ registered in the management information and the partial image $s'_i$, the difference between the result of the image analysis process on the partial image $s'_i$ and the result of the image analysis process on the corresponding image $s_i$ registered in the management information is increased. It is also considered that the smaller the difference between the corresponding image $s_i$ and the partial image $s'_i$, similarity between the result of the image analysis process on the partial image $s'_i$ and the result of the image analysis process on the corresponding image $s_i$ registered in the management information are increased.

Therefore, in the present exemplary embodiment, the image processing apparatus 100 executes the image analysis process on some of the partial images determined according to the priorities among the partial images generated from the input image I2, and does not execute the image analysis process on the other partial images. The image processing apparatus 100 uses, as the analysis results of the partial images that are not subjected to the image analysis process, the estimated numbers of people registered in the management information.

As described above, by executing the image analysis process on only some of the partial images, the image processing apparatus 100 can achieve a faster image analysis process than in a case where the image processing apparatus 100 executes the image analysis process on all the partial images.

The details of the process of step S306 are described.

In the present exemplary embodiment, the priority $p_i$ is an indicator defined by the following formula (1):

$$p_i = f(s_i, s'_i) + \lambda g(t_i, T2) \qquad (1).$$

In formula (1), a function f is a function that receives two images as arguments and outputs the amount of change between the two images as the arguments. In the present exemplary embodiment, the function f is a function that outputs the total of the absolute values of the differences between the pixel values of pixels corresponding to each other in the two images. That is, in the present exemplary embodiment, the amount of change between the two images is the total of the absolute values of the differences between the pixel values of pixels corresponding to each other in the two images. Consequently, the determination unit 203 determines the priority of a partial image to be higher with an increasing change between pixel values in a corresponding image, which is registered in the management information and corresponds to the partial image, and pixel values in the partial image. Further, to deal with also a case where pixel values in partial images change across the partial images due to a change in illumination, the determination unit 203 may perform preprocessing for normalizing the pixel values in each of the partial images and then obtain the amount of change using the function f.

In the present exemplary embodiment, the amount of change between the two images is the total of the absolute values of the differences between the pixel values of pixels corresponding to each other in the two images.

Alternatively, as another example, the amount of change between the two images may be the total of the absolute values of the differences between the values of bins in luminance histograms created from the two respective images. In this case, the function f is a function that outputs the total of the absolute values of the differences between the values of bins in luminance histograms created from the two respective images as the arguments.

Yet alternatively, the amount of change between the two images may be the sum of the lengths of motion vectors of the two images. In this case, the function f is a function that obtains motion vectors of the two images from the two images as the arguments and outputs the total of the lengths of the obtained motion vectors.

In formula (1), the function g is a function that takes two timestamps as arguments and outputs a value that is to be higher with an increasing difference between the timestamps.

Based on $g(t_i, T2)$ in formula (1), the determination unit 203 can determine the priority of a partial image corresponding to the timestamp T2 to be higher with an increasing time period elapsing from the time indicated by the timestamp T2 registered in the management information.

In formula (1), $\lambda$ is a parameter determined in advance to weight the two functional terms f and g.

In the present exemplary embodiment, the determination unit 203 determines the priority of each partial image $s'_i$ using formula (1). Alternatively, the determination unit 203 may determine the priority of the partial image $s'_i$ by a different method. For example, if the value of $g(t_i, T2)$ exceeds a threshold determined in advance, the determination unit 203 may determine the priority of the partial image $s'_i$ as a value set as the maximum value of the priority. Consequently, if a certain time elapses in the state where the image analysis process is not executed on any of the partial areas, the image processing apparatus 100 can execute the image analysis process without fail.

For example, the determination unit 203 may determine the priority of a partial image of a partial area specified in advance by further adding a certain value to the priority. Consequently, the image processing apparatus 100 can increase the frequency of the image analysis process on a partial area where the number or the flow of people in a crowd is predicted to frequently change, or an important partial area.

FIG. 7 illustrates examples of the priorities determined for the partial images by the determination unit 203. In the examples of FIG. 7, each of the priorities of a partial image $s'_1$ corresponding to the first partial area and a partial image $s'_3$ corresponding to the third partial area is 0.1. The priority of a partial image $s'_2$ corresponding to the second partial area is 0.5. The priority of a partial image $s'_N$ corresponding to the N-th partial area is 0.8.

In the examples of FIG. 7, the change between the corresponding image and each of the first partial area and the third partial area is smaller than the change between the corresponding image and each of the other partial areas. Thus, the priority of the partial image corresponding to each of the first partial area and the third partial area also has a smaller value than that of the partial image corresponding to each of the other partial areas.

In step S307, from among the partial images the priorities of which are determined in step S306, the analysis unit 204 selects as many partial images as a number (a number greater than or equal to 1 and less than N) determined in advance in descending order of priorities. The analysis unit 204 executes the image analysis process on the selected partial images.

Alternatively, as another example, in step S307, the analysis unit 204 may continue to execute the image analysis process on the partial images in descending order of corresponding priorities during a period determined in advance. Yet alternatively, the analysis unit 204 may execute the image analysis process on all the partial images having corresponding priorities greater than or equal to a threshold determined in advance.

Then, using the analysis results of the partial images subjected to the image analysis process, the management unit 205 updates the management information stored in the memory 11. More specifically, the management unit 205 changes the estimated number of people corresponding to the partial area indicated by each of the partial images subjected to the image analysis process by the analysis unit 204 to the result of the image analysis process on the partial image. The management unit 205 changes the corresponding image corresponding to the partial area indicated by each of the partial images subjected to the image analysis process to the partial image. The management unit 205 changes the timestamp corresponding to the partial area indicated by each of the partial images subjected to the image analysis process to the timestamp of the input image I2 corresponding to the partial image.

FIG. 8 illustrates an example of the management information updated by the management unit 205. In the example of FIG. 8, the image analysis process is executed on the partial image corresponding to each of the second partial area and the N-th partial area. The image analysis process is not executed on the partial image corresponding each of to the first partial area and the third partial area. The management information in FIG. 8 indicates that the information regarding the items corresponding to each of the second partial area and the N-th partial area is updated from the states illustrated in FIGS. 5 and 7. The management information in FIG. 8 indicates that the information regarding the items corresponding to each of the first partial area and the third partial area is not updated from the states illustrated in FIGS. 5 and 7.

The image processing apparatus 100 treats the values of the estimated numbers of people corresponding to the partial areas indicated by the management information updated by the above processing, as the results of the image analysis process corresponding to the partial areas in the input image I2.

In step S308, the display control unit 206 displays on the display device 13 the input image I2 acquired by the acquisition unit 201 in step S304 and information regarding the estimated numbers of people corresponding to the partial areas indicated by the management information.

Figure 9A:
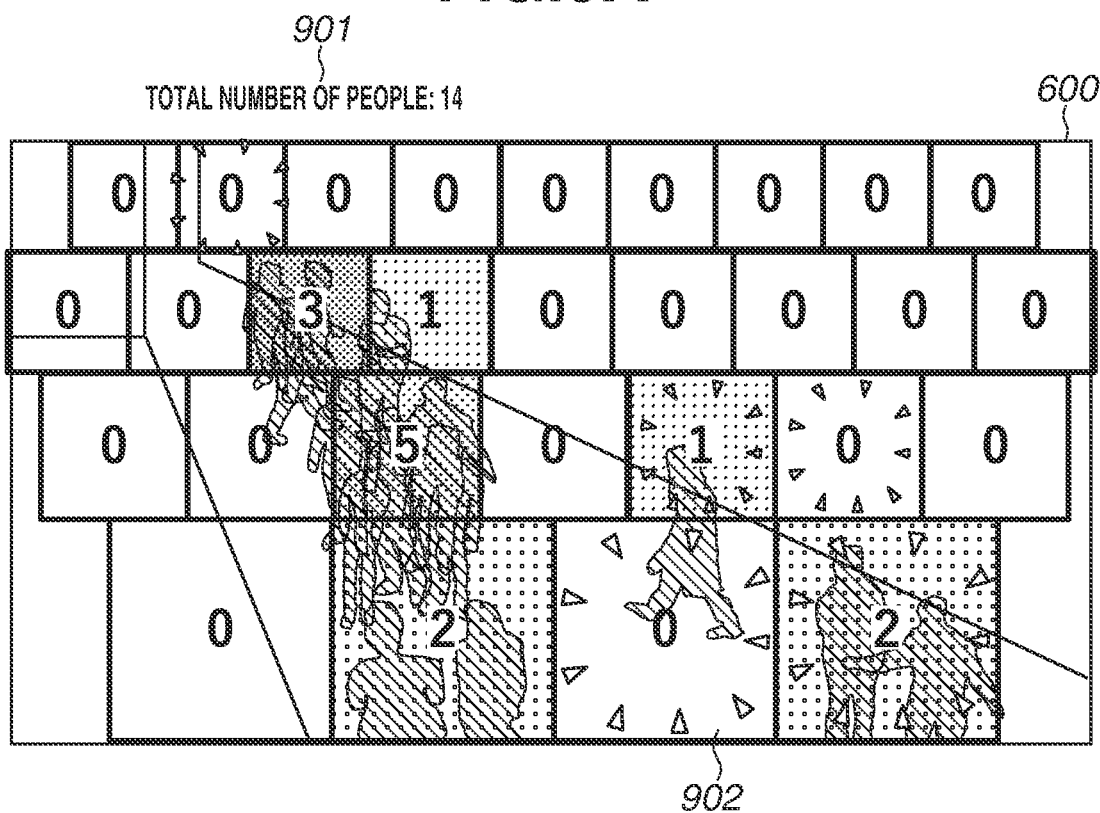
FIGS. 9A and 9B are diagrams illustrating examples of a displayed image.

FIG. 9A illustrates an example of an image displayed by the display control unit 206 in step S308. The display control unit 206 displays frames indicating the partial areas in a superimposed manner on the input image I2 and displays a numerical value indicating the estimated number of people corresponding to each of the partial areas at the center of the partial area.

In the present exemplary embodiment, further, to visually clarify a crowded partial area on the image, the display control unit 206 colors each of the partial areas with a color according to the estimated number of people corresponding to the partial area. The display control unit 206 displays the total of the estimated numbers of people corresponding to the partial areas in a text area 901 above the image.

In the present exemplary embodiment, further, the display control unit 206 displays the estimated number of people corresponding to each of the partial areas in a form according to the timing when the image analysis is actually performed on the partial image corresponding to the partial area. More specifically, the display control unit 206 displays a partial area where the estimated number of people is updated by the image analysis process on the latest input image I2, in a form determined in advance (e.g., a form in which the partial area instantly blinks, or a form in which an effect 902 is displayed in a superimposed manner on the partial area). This enables the user to grasp the timing when the image analysis result of each of the partial areas is updated.

In a case where the entirety of the image greatly changes, partial areas having priorities greater than or equal to the threshold increase. Consequently, there can be a case where the execution of the image analysis process by the analysis unit 204 in step S307 does not end within a predetermined period. Therefore, in the present exemplary embodiment, if there is a partial image for which a priority greater than or equal to the threshold is determined in step S306, but which is not subjected to the image analysis process in step S307, the display control unit 206 displays information indicating that the reliability of the result of the image analysis process is decreasing.

Figure 9B:
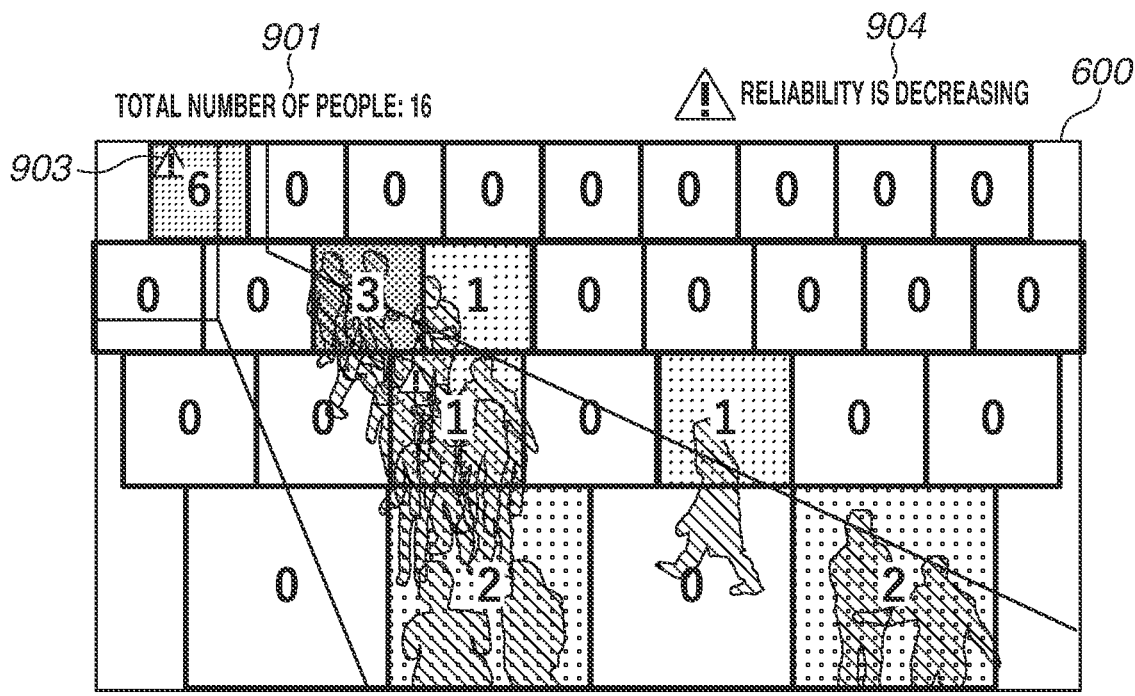

More specifically, the display control unit 206 displays on the display device 13 a sign 903 illustrated in FIG. 9B in a partial area corresponding to a partial image that has a priority greater than or equal to the threshold, but is not subjected to the image analysis process. If the number of partial images that have priorities greater than or equal to the threshold, but are not subjected to the image analysis process is greater than or equal to a predetermined threshold (e.g., 1, 2, or 5), the display control unit 206 further displays information indicating that the reliability of the results of the image analysis process on the entirety of the image is decreasing. In the present exemplary embodiment, the display control unit 206 displays text 904 on the display device 13.

In step S309, the display control unit 206 determines whether an instruction to end the image analysis process is received via the input device 14. In a case where it is determined that an instruction to end the image analysis process is received (YES in step S309), the processing procedure of the flowchart illustrated in FIG. 3 ends. In a case where it is determined that an instruction to end the image analysis process is not received (NO in step S309), the processing proceeds to step S304.

As described above, in the present exemplary embodiment, based on the change between each partial area in the input image I2 and the corresponding image registered in the management information, the image processing apparatus 100 determines a priority in the image analysis process for the partial area. Then, the image processing apparatus 100 executes the image analysis process on each of some of the partial images determined according to the priorities.

Then, the image processing apparatus 100 treats the management information updated using the results of the executed image analysis process, as the results of the image analysis process on the input image I2. Consequently, the image processing apparatus 100 can execute the image analysis process faster than in a case where the image processing apparatus 100 executes the image analysis process on all the partial images. That is, since the image processing apparatus 100 executes the image analysis process on each of some of the partial images determined according to the priorities, a faster image analysis process can be achieved.

In a second exemplary embodiment, the image processing apparatus 100 determines the priorities of partial images using an image analysis process by two types of methods. In the present exemplary embodiment, similarly to the first exemplary embodiment, the image analysis process executed by the image processing apparatus 100 is a number-of-people estimation process for estimating the number of people in an image.

The hardware configuration and the functional configuration of the image processing apparatus 100 according to the present exemplary embodiment are similar to those according to the first exemplary embodiment.

FIG. 10 is a flowchart illustrating an example of the processing of the image processing apparatus 100 according to the present exemplary embodiment. The processes of steps S301, S302, S304, S305, and S309 in FIG. 10 are similar to those in FIG. 3. In the processing procedure of the flowchart illustrated in FIG. 10, the differences from FIG. 3 are described.

In step S1003, the analysis unit 204 performs an image analysis process by two methods on all the partial images generated by the generation unit 202 in step S302. One method is a method similar to that in the first exemplary embodiment and for performing the image analysis process using an image analyzer similar to that in the first exemplary embodiment. Hereinafter, this method will be referred to as a "first method". Hereinafter, the image analyzer used in the first method will be referred to a "first analyzer".

The other method is a method for performing the image analysis process using an image analyzer having a processing load smaller than that of the image analyzer used in the first exemplary embodiment. Hereinafter, this method will be referred to as a "second method". Hereinafter, the image analyzer used in the second method will be referred to as a "second analyzer".

The second analyzer has a processing load smaller than that of the first analyzer and is faster than the first analyzer, but has a low analysis accuracy.

The first analyzer is, for example, an analyzer using a technique by which a relatively great amount of calculation is performed, such as deep learning. The second analyzer is, for example, an analyzer that estimates the number of people by regression from a feature amount obtained by a relatively small amount of calculation, such as a moving object amount or an edge amount, in an image.

In the present exemplary embodiment, management information stored in the memory 11 is a table that, with respect to each partial area, stores information regarding items such as an index, a corresponding image, the number of people estimated by the first analyzer, the number of people estimated by the second analyzer, and a timestamp.

The index, the corresponding image, and the timestamp are similar to those in FIG. 5. The number of people estimated by the first analyzer indicates the result of the number-of-people estimation process using the first analyzer on a corresponding image corresponding to the number of people estimated by the first analyzer. The number of people estimated by the second analyzer indicates the result of the number-of-people estimation process using the second analyzer on a corresponding image corresponding to the number of people estimated by the second analyzer.

In the present exemplary embodiment, similarly to the first exemplary embodiment, a corresponding image and a timestamp registered in the management information and corresponding to the i-th partial area are represented as $s_i$ and $t_i$, respectively. In the present exemplary embodiment, the number of people estimated by the first analyzer registered in the management information and corresponding to the i-th partial area is represented as $e_i$. The number of people estimated by the second analyzer registered in the management information and corresponding to the i-th partial area is represented as $\varepsilon_i$.

Next, with respect to each of the partial areas, the management unit 205 registers, in the management information, a partial image corresponding to the partial area, the result of the image analysis process using the first method on the partial image by the analysis unit 204, the result of the image analysis process using the second method, and the timestamp of the partial image.

The management information illustrated in FIG. 11 indicates the content of the management information at the end time of the process of step S1003 in the present exemplary embodiment.

In step S1006, the determination unit 203 determines a priority for performing image analysis on each of the N partial images generated in step S305. The priorities indicate that on the partial image having a greater value of the priority, it is more desirable to preferentially perform the image analysis process using the first method which is accurate.

In the present exemplary embodiment, the determination unit 203 determines the priority of the partial image $s'_i$ corresponding to the i-th partial area based on the number of people $\varepsilon_i$, which is estimated by the second analyzer and registered in the management information, and the result of the image analysis process using the second method on the partial image $s'_i$.

That is, the image processing apparatus 100 performs the image analysis process using the second method on the partial image $s'_i$ and evaluates the change between the partial image $s'_i$ and the corresponding image $s_i$ based on the analysis result of the image analysis process and the number of people $\varepsilon_i$, which is estimated by the second analyzer and registered in the management information.

A description is given of a determination process for determining the priority $p_i$ by the determination unit 203 in the present exemplary embodiment. The determination unit 203 executes the image analysis process using the second method on the partial image $s'_i$ generated in step S305. Hereinafter, the result (the estimated number of people) of the image analysis process using the second method on the partial image $s'_i$ will be represented as $\varepsilon'_i$.

Then, the determination unit 203 obtains the priority $p_i$ of the partial image $s'_i$ using the following formula (2):

$$p_i = h(\varepsilon_i, \varepsilon'_i) + \lambda g(t_i, T2) \qquad (2).$$

In formula (2), a function h is a function that takes the two results of the image analysis process using the second method as arguments, indicates the magnitude of the change between the partial image $s'_i$ and the corresponding image $s_i$ from the two results, and outputs an evaluation value. In the present exemplary embodiment, the function h is represented by the following formula (3):

$$h(\varepsilon_i, \varepsilon'_i) = |\varepsilon_i - \varepsilon'_i| \qquad (3).$$

In formula (2), a function g is the same as the function g in formula (1). $\lambda$ is a parameter determined in advance to weight the two functional terms.

In the present exemplary embodiment, the determination unit 203 determines the priority of the partial image $s'_i$ using formula (2). Alternatively, as another example, the determination unit 203 may determine the priority of the partial image $s'_i$ by a different method. For example, using as the function h a polynomial related to the three variables $e_i$, $\varepsilon_i$, and $\varepsilon'_i$, the determination unit 203 may perform fitting using learning data. Yet alternatively, the determination unit 203 may obtain the priority $p_i$ using a formula obtained by adding the function f described in the first exemplary embodiment to the right side of formula (2).

FIG. 12 illustrates examples of the priorities determined for the partial images by the determination unit 203. In the examples of FIG. 12, the priority of a partial image $s'_1$ corresponding to the first partial area is 0.2. The priority of a partial image $s'_2$ corresponding to the second partial area is 1.2. The priority of a partial image $s'_3$ corresponding to the third partial area is 0.1. The priority of a partial image $s'_N$ corresponding to the N-th partial area is 2.8. It is understood that in the examples of FIG. 12, the priority of each of the partial image $s'_1$ and $s'_3$ has a relatively lower value than that of the priority of each of the other partial images.

In step S1007, from among the partial images the priorities of which are determined in step S1006, the analysis unit 204 identifies as many partial images as a number determined in advance in descending order of priorities. The analysis unit 204 executes the image analysis process using the first method on the identified partial images.

Alternatively, as another example, in step S1007, the analysis unit 204 may continue to execute the image analysis process using the first method on the partial images in descending order of corresponding priorities during a period determined in advance. Yet alternatively, the analysis unit 204 may execute the image analysis process using the first method on all the partial images having corresponding priorities greater than or equal to a threshold determined in advance.

Then, using the analysis results of the partial images subjected to the image analysis process using the first method, the management unit 205 updates the information regarding the partial areas corresponding to the partial images in the management information stored in the memory 11. More specifically, the management unit 205 changes the number of people estimated by the first analyzer corresponding to the partial area indicated by each of the partial images subjected to the image analysis process to the result of the image analysis process using the first method on the partial image. The management unit 205 changes the number of people estimated by the second analyzer corresponding to the partial area indicated by each of the partial images subjected to the image analysis process to the result of the image analysis process using the second method on the partial image.

The management unit 205 changes the corresponding image corresponding to the partial area indicated by each of the partial images subjected to the image analysis process to the partial image. The management unit 205 changes the timestamp corresponding to the partial area indicated by each of the partial images subjected to the image analysis process to the timestamp of the input image I2 corresponding to the partial image.

FIG. 13 illustrates an example of the updated management information. In the example of FIG. 13, the image analysis process using the first method is executed on the partial image corresponding to each of the second partial area and the N-th partial area. The image analysis process using the first method is not executed on the partial image corresponding to each of the first partial area and the third partial area.

The management information in FIG. 13 indicates that the information regarding the items corresponding to each of the second partial area and the N-th partial area is updated from the states illustrated in FIGS. 11 and 12. The management information in FIG. 13 indicates that the information regarding the items corresponding to each of the first partial area and the third partial area is not updated from the states illustrated in FIGS. 11 and 12.

The image processing apparatus 100 treats the values of the numbers of people estimated by the first analyzer corresponding to the partial areas indicated by the management information updated by the above processing, as the results of the image analysis process corresponding to the partial areas in the input image I2.

In step S1008, the display control unit 206 displays, on the display device 13, an image acquired by the acquisition unit 201 and the numbers of people estimated by the first analyzer registered in the management information.

In a third exemplary embodiment, the image processing apparatus 100 performs an image analysis process on a plurality of images acquired from a plurality of imaging apparatuses.

The hardware configuration and the functional configuration of the image processing apparatus 100 according to the present exemplary embodiment are similar to those according to the first exemplary embodiment.

In the present exemplary embodiment, the connected imaging apparatus is M imaging apparatuses (hereinafter, "cameras 1 to M"). That is, the image processing apparatus 100 is connected to each of the cameras 1 to M. In the present exemplary embodiment, the input image acquired by the acquisition unit 201 in each of steps S301 and S304 is M images acquired from the cameras 1 to M.

In the present exemplary embodiment, N1 to NM partial areas are set in advance in respective images captured by the cameras 1 to M. That is, the number N of the partial areas set in the input image is N1+N2+ . . . +NM.

In step S305, the generation unit 202 generates partial images corresponding to the N1 to NM partial areas from the respective images acquired from the cameras 1 to M, to generate N generation images.

The image processing apparatus 100 assigns serial indices 1 to N to these N partial images. Then, using the methods described in the first and second exemplary embodiments, the image processing apparatus 100 determines a priority for each of the partial images and performs an image analysis process according to the priorities.

There is a case where in a certain time period, the number of people and the flow of people quickly change in an image acquired from a camera a, while the number of people and the flow of people hardly change in an image acquired from a camera b. In such a case, in the present exemplary embodiment, the determination unit 203 may determine a higher priority for a partial image generated from the image acquired from the camera a than for a partial image generated from the image acquired from the camera b. Consequently, the analysis unit 204 can perform the image analysis process on the partial image generated from the image acquired from the camera a in priority to the partial image generated from the image acquired from the camera b.

In the first to third exemplary embodiments, the image analysis process executed by the image processing apparatus 100 is the number-of-people estimation process for estimating the number of people in an image. Alternatively, as another example, the image analysis process executed by the image processing apparatus 100 may be another image analysis process so long as the image analysis process can be independently performed on a partial image. For example, the image analysis process executed by the image processing apparatus 100 may be a process, such as a flow-of-people estimation process (the process of estimating the direction of the flow of people) and a crowd abnormality determination process (the process of determining an abnormal behavior in a crowd).

For example, a case is considered where the image processing apparatus 100 performs, as the image analysis process, the process of estimating the direction of the flow of people. In this case, a priority may be defined to be set higher for a partial image corresponding to a partial area that is to be likely having an increasing difference between the analysis result of the flow of people stored in the memory 11 and an analysis result of the flow of people to be obtained as a result of analyzing the flow of people. Consequently, the image processing apparatus 100 can perform a fast image analysis process capable of quickly following a change in the actual flow of people.

In the first to third exemplary embodiments, the target object of the image analysis process is a person. Alternatively, as another example, the target object of the image analysis process may be, for example, a vehicle such as an automobile or an animal other than a human being.

While examples of exemplary embodiments of the present invention have been described in detail above, the present invention is not limited to such particular exemplary embodiments. For example, the above exemplary embodiments may be optionally combined together.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-069997, filed Apr. 1, 2019, which is hereby incorporated by reference herein in its entirety.

What is claimed is:

1. An image processing apparatus comprising:
a processor; and
a memory storing executable instructions which, when executed by the processor, cause the image capturing apparatus to perform operations including:
determining for each of a plurality of partial areas set in a first image, a priority for executing a first image analysis process for estimating a number of people in an image, based on the first image and a second image analyzed before the first image, wherein the priority is determined based on at least one of (1) a total of absolute values of differences between pixel values of pixels in the partial area in the first image and pixel values of the corresponding partial area in the second image, (2) a total of absolute values of differences between bins of a luminance histogram created from the partial area in the first image and bins of a luminance histogram created from the corresponding partial area in the second image, or (3) a total of lengths of motion vectors estimated based on the first image and the second image;
selecting at least one of partial areas from the plurality of partial areas, based on the determined priority;
executing the first image analysis process on each of the selected partial areas; and
outputting a number of people in the first image based on a number of people in the second image and a result of the first analysis.

2. The image processing apparatus according to claim 1, wherein, for each of the plurality of partial areas, the priority is determined, based on a difference between an input timing of the first image and an input timing of the second image and the amount of change.

3. The image processing apparatus according to claim 1, wherein executing the executable instructions causes the information processing apparatus to perform further operations including:
executing, for each of the plurality of partial areas, a second image analysis process for estimating a number of people in an image,
wherein, the priority is determined based on a result of the second image analysis process on each of the plurality of partial areas, and
the second image analysis process has a processing load smaller than a processing load of the first image analysis process.

4. The image processing apparatus according to claim 1, wherein the first image is a plurality of images acquired from a plurality of imaging apparatuses.

5. The image processing apparatus according to claim 1, wherein the first image analysis process includes a flow-of-people estimation process for estimating a flow of people in an image.

6. The image processing apparatus according to claim 1, wherein the first image analysis process includes a determination process for determining an abnormality in an image.

7. The image processing apparatus according to claim 1, wherein executing the executable instructions causes the information processing apparatus to perform further operations including:
storing, for each of the plurality of partial areas, result information indicating a result of the first image analysis process; and
updating, for each of the at least one of partial areas, the stored result information, based on the result of the first image analysis process.

8. The image processing apparatus according to claim 7, wherein executing the executable instructions causes the information processing apparatus to perform further operations including:
displaying, on a display unit, the result of the first image analysis process indicated by the result information on each of the plurality of partial areas.

9. The image processing apparatus according to claim 8, wherein based on a timing when the first image analysis process is executed on each of the plurality of partial areas, the result of the first image analysis process indicated by the result information on each of the plurality of partial areas is displayed.

10. The image processing apparatus according to claim 1, wherein based on the determined priority, a predetermined number of partial areas is selected from the plurality of partial areas.

11. The image processing apparatus according to claim 1, wherein based on the determined priority, a partial area having the priority greater than or equal to a set threshold is selected from the plurality of partial areas.

12. The image processing apparatus according to claim 8, wherein information that an accuracy of the first image analysis process is decreasing is displayed, in a case where the plurality of partial areas includes a partial area that has the priority greater than or equal to a set threshold and is not subjected to the first image analysis process.

13. The image processing apparatus according to claim 1, wherein executing the executable instructions causes the information processing apparatus to perform further operations including:

setting, in the first image, the plurality of partial areas based on a size of an analysis target in the first image analysis process.

14. An image processing method comprising:

determining, for each of a plurality of partial areas set in a first image, a priority for executing a first image analysis process for estimating a number of people in an image, based on the first image and a second image analyzed before the first image, wherein the priority is determined based on at least one of (1) a total of absolute values of differences between pixel values of pixels in the partial area in the first image and pixel values of the corresponding partial area in the second image, (2) a total of absolute values of differences between bins of a luminance histogram created from the partial area in the first image and bins of a luminance histogram created from the corresponding partial area in the second image, or (3) a total of lengths of motion vectors estimated based on the first image and the second image;

selecting at least one of partial areas from the plurality of partial areas, based on the determined priority;

executing the first image analysis process on each of the selected partial areas; and outputting a number of people in the first image based on a number of people in the second image and a result of the first analysis.

15. A non-transitory computer-readable storage medium that stores a program for causing a computer to execute an image processing method comprising:

determining, for each of a plurality of partial areas set in a first image, a priority for executing a first image analysis process for estimating a number of people in an image, based on the first image and a second image analyzed before the first image, wherein the priority is determined based on at least one of (1) a total of absolute values of differences between pixel values of pixels in the partial area in the first image and pixel values of the corresponding partial area in the second image, (2) a total of absolute values of differences between bins of a luminance histogram created from the partial area in the first image and bins of a luminance histogram created from the corresponding partial area in the second image, or (3) a total of lengths of motion vectors estimated based on the first image and the second image;

selecting at least one of partial areas from the plurality of partial areas, based on the determined priority;

executing the first image analysis process on each of the selected partial areas; and outputting a number of people in the first image based on a number of people in the second image and a result of the first analysis.

16. The image processing apparatus according to claim 1, wherein the selected partial areas are output in a manner different from areas not selected.

17. The image processing apparatus according to claim 1, wherein the number of people in the first image is output based on the result of the first analysis performed on the selected partial area and based on the number of people in the second image.

* * * * *